United States Patent

Graab et al.

[11] Patent Number: 5,824,735
[45] Date of Patent: Oct. 20, 1998

[54] MOIRE FLOOR COVERING AND METHOD FOR ITS MANUFACTURE

[75] Inventors: Gerhard Graab, Mannheim; Klaus Heckel, Gorxheimertal; Alfons Butscher, Birkenau; Torsten Nahe, Birhenheide, all of Germany

[73] Assignee: Firma Carl Freudenberg, Weinheim, Germany

[21] Appl. No.: 610,200

[22] Filed: Mar. 4, 1996

[30] Foreign Application Priority Data

Mar. 2, 1995 [DE] Germany .......................... 195 07 113.1

[51] Int. Cl.$^6$ ...................................................... E04F 11/16
[52] U.S. Cl. ................................. 524/575; 52/177; 52/664
[58] Field of Search ............................... 524/575; 52/177, 52/664

[56] References Cited

U.S. PATENT DOCUMENTS 2,083,201   6/1937   Poppe .

FOREIGN PATENT DOCUMENTS

| 582 770A1 | 2/1994 | European Pat. Off. . |
| 1 479 873 | 3/1969 | Germany . |
| 1 479 873A | 3/1969 | Germany . |
| 41 14 575C | 5/1992 | Germany . |
| Cl 41 14 575 | 5/1992 | Germany . |
| 777 748 | 6/1957 | United Kingdom . |

OTHER PUBLICATIONS

Oberseite Elastischer Bodenbelage, Bezeichnungen RAL–RG 725/1, Deutsches Institut fur Gutesicherung und Kennzeichnung, Nov. 1983.

*Primary Examiner*—Edward J. Cain
*Attorney, Agent, or Firm*—Kenyon & Kenyon

[57] ABSTRACT

A rubber moiré floor covering is disclosed. The covering is produced by continuously feeding a screw-type short extruding machine having a length/diameter ratio of 6:1 with two or three varicolored strips of vulcanizable elastomeric material. The operating temperature is between 60° C. to 100° C. The elastomeric material leaves the extruder via a perforated disk having 200 to 600 cylindrical bore holes 3–5 mm in diameter. Each of the resulting strands is severed to produce segments that are 1 to 2 mm thick, the formed pieces are then cooled off on a section 4 meters to 6 meters long. Subsequently, the formed pieces are allowed to fall into the roll nip of a temperature controllable two-bowl calendar. The web of material leaving the calendar is fed to a continuous vulcanization installation and leaves it as finished floor covering. The material throughput rate in this continuous process may be varied from 700 kg/h up to 1300 kg/h.

8 Claims, No Drawings

MOIRE FLOOR COVERING AND METHOD FOR ITS MANUFACTURE

BACKGROUND OF THE INVENTION

Moiré-type floor coverings that are primarily made of polyvinyl chloride (PVC) or linoleum have been used in a number of settings, particularly sports halls. (The term moiré describes a known pattern type that is further defined in RAL-HG 725/1, 1983 version.

Such known floor covering materials are deficient in their resistance to hot cigarette ash. DIN regulation 51961 (a German industrial standard) on this matter is not met by PVC, and is only partially satisfied by linoleum. Unfortunately, linoleum is susceptible to burn marks of the type having tar constituents, which are very difficult to remove.

DIN 18032 imposes a requirement of a minimum reflectance of 0.2 for sports floor coverings. In addition to the reflectance requirement, the pattern of such floor coverings should not so dominate its contrast level that sharp color contrasts unduly impair the visibility of the playing court markings.

Moiré floor coverings are particularly well suited to meeting these two visual requirements. Moreover, stress marks caused by repeated impact of the soles of sports shoes show up less clearly on such coverings.

Rubber is particularly well suited for use in this application, as it is less expensive to care for, and stands up best to intensive stress from the sort of use that occurs in sports halls. Nevertheless, it has heretofore not been possible to produce moiré floor coverings, particularly with the required level of light reflectance and better resistance to hot cigarette ash, from rubber.

DE-C1-41 14 575 discloses a method for the continuous manufacture of a direction-free patterned floor covering made of vulcanizable, elastomeric material using the following process steps:

- A screw-type short extruding machine having a length/diameter ratio of 4:1 to 10:1 is fed continuously with two or three varicolored strips of vulcanizable elastomeric material at an operating temperature of 60° C. to 100° C.;
- the elastomeric material is conveyed through the extruder at a flow rate of 400 kg/h to 600 kg/h without intimate blend of colors in the strands;
- the elastomeric material is delivered through a perforated disk to yield 200 to 600 strands having diameters of between 2 mm to 10 mm, respectively;
- the strands are severed as they emerge from the perforated disk, making formed pieces 1 mm to 2 mm thick each;
- the severed formed pieces are allowed to fall directly into the roll nip of a two-bowl calendar whose rolls have a diameter/length ratio of 1:3.5 and a surface temperature of 60° C. to 100° C., and are concentrated under the effect of heat and pressure to form a homogeneous web of material;
- the concentrated web of material leaving the calendar is fed directly to a continuously working vulcanization installation in which the final vulcanization is carried out at 160° C. to 180° C. to form the finished flooring sheet.

The floor covering produced in this manner has not only a completely direction-free pattern on its surface, its material web is also devoid of air pockets. No further process steps for the production of a pattern (such as the removal of layers of material near the surface) are necessary.

The present invention is directed to the further development of a floor covering made of a material that is sturdier and easier to maintain than PVC or linoleum. In order that this material may be used as a floor covering in sports facilities, it should have a minimal level of reflectance of 0.2 in accordance with DIN 18032, and its pattern should show a preferential direction both through its entire cross-section as well as on the surface of the flooring sheet. However, the pattern itself should not so dominate in its contrast and its outlines that any playing court markings would fail to stand out sufficiently optically. The pattern should be of the "moiré" type in accordance with RAL-HG 725/1 (November 1983 version).

SUMMARY OF THE INVENTION

The invention provides for a floor covering of this type that is made of rubber (i.e., a viscoelastic material). In addition, a method for manufacturing such a floor covering is disclosed.

Moiré floor coverings (as defined herein) and, in particular, rubber floor coverings that are moiré over their entire cross section, have not heretofore been known. In contrast to the use of PVC or linoleum, the economical processing of vulcanizable elastomeric materials into such a colored surface design presents a process engineering challenge. For example, sharply colored directional contrasts may develop in the pattern, interfering with the visibility of the playing court markings. Another problem is that the top and bottom surfaces of the covering may develop broad, adjacent regions of variably strong patterns which have reflectances that sharply differ from each other, and thus provide the general impression of areas whose minimum reflectance is under 0.2. Hence, the general impression that such known surfaces present is one which is disturbingly dark-spotted.

In accordance with the instant invention, it has been determined that by varying the method taught in DE-C1-41 14 575—a method that is taught for the continuous manufacture of a direction-free patterned floor covering—a directed, patterned floor covering along the lines of a moiré finish can be produced, the pattern being present over the entire cross-section of the floor covering. The method can be carried out continuously and therefore is very cost-effective. The advantages provided by the use of rubber material with regard to cleaning and mechanical load-bearing capacity can be utilized without the need for any additional protective surface coatings.

DETAILED DESCRIPTION OF THE INVENTION

The method according to the invention differs from that of DE-C1-41 14 575 as follows. Two or three varicolored strips of vulcanizable elastomeric material are fed to an extruding machine having a length/diameter ratio of 4:1 to 10:1 (in one embodiment, a ratio of 6:1 is used), their material throughput rate within the process being increased to the range of 700 kg/h to 1300 kg/h. The strands emerge from a perforated disk having 200 to 600 cylindrical bore holes 2–10 mm (and in one embodiment, preferably 3–5 mm) in diameter. The formed pieces, which are severed from the strands emerging from the perforated disk at 1 to 2 mm length each, are not allowed to fall directly into the roll nip of the two-bowl calendar. Instead, before entering into the calendar, the strands pass through a cooling-off section of 4 to 6 m in length that is at room temperature. The cooling-off section can consist of a standard conveying device, e.g., a heatresistant rubber conveyer belt whose speed is adjusted to provide the desired material throughput rate. The cooling-off section can easily be interposed in existing installations for the manufacture of direction-free floor coverings made of rubber.

These modifications to the prior art method presented herein unexpectedly provide an effective and inexpensive continuous process for resolving the problems in the prior art discussed above. The changes to the process do not compromise the continuity of the process, which provides an increased material throughput rate which further reduces production costs.

The absence of directionality present in prior art processes is negated in such a way that a defined, directed moiré pattern is formed on both the surface and through the cross-section of the flooring sheet. By simple selection of an optimized throughput rate within the defined limits, and depending on the choice of colors for the vulcanizable elastomeric material strips used, any desired aesthetic appearance can readily be attained by means of a few preliminary tests (the light reflectance also being adjustable to meet the requirement). The resulting surface has no surface areas greater in size than the size of a little finger which could be interpreted as bright or dark zones. While when viewed from more than two meters the pattern may appear to be slightly directed, the overall impression is still one of homogeneity. With the production steps set forth herein, the unwanted development during production of adjacent arrangements of light or dark surfaces, which might possibly produce independent line impressions disturbing playing court markings in the eye of the observer, is ruled out. Hence, the invention provides a moiré floor covering which is also particularly suitable for sports sites because of its directed, but nevertheless inconspicuous pattern, which requires no protective coating, is composed of rubber (with all its associated advantages), and can be produced in a continuous, known and reliable process proceeding very rapidly and, consequently, cost-effectively.

What is claimed is:

1. A floor covering for use in sports halls, wherein the floor covering consists of rubber and comprises a plurality of base colors, and the floor covering is of the moiré type, which is defined to mean that it has a top side bearing a generally irregular pattern that is multicolored, with the arrangement of the colors being clearly oriented to one direction of the covering and wherein the pattern has directional orientation and exhibits a branching appearance.

2. A method for continuously manufacturing a moiré floor covering suitable for use as the playing area of a sports arena, comprising the steps of:

continuously feeding a plurality of varicolored strips of vulcanizable elastomeric material at an operating temperature of 60 to 100 degrees C. to a screw-type short extruding machine having a length/diameter ratio of between 4:1 and 10:1;

conveying the elastomeric material through the extruder so as to avoid the intimate blending of the colors of the individual strands;

passing the elastomeric material through a perforated disk so as to form 200 to 600 strands having diameters of between 2 and 10 mm;

severing the strands emerging from the disk to provide 1 to 2 mm thick formed pieces;

cooling the formed pieces in a cooling section maintained at room temperature;

dropping the severed formed pieces into the roll nip of a two-bowl calendar whose rolls have a diameter/length ratio of 1:3.5 and a surface temperature of 60° to 100° C., by which the severed formed pieces are concentrated under the effect of heat and pressure to form a homogeneous web of material; and feeding the concentrated web of material leaving the calendar directly to a continuously working vulcanization installation in which the final vulcanization is carried out at 160° to 180° C. to form the finished flooring sheet, wherein the process is carried out at a throughput rate of 700 to 1300 kg/h.

3. The method of claim 2, wherein the holes in the perforated disk produce strands having diameter of between 3 and 5 mm.

4. The method of claim 2, wherein the cooling section is a conveyor.

5. The method of claim 4, wherein the conveyor is 4–6 meters long.

6. The method of claim 2, wherein the extruding machine has a length/diameter ratio of 6:1.

7. The method of claim 2, wherein the number of types of colored material used is 2.

8. The method of claim 2, wherein the number of types of colored material used is 3.

* * * * *